United States Patent
Buck

(10) Patent No.: US 6,259,223 B1
(45) Date of Patent: Jul. 10, 2001

(54) METHOD AND APPARATUS FOR PHASE COMPENSATION IN A VEHICLE CONTROL SYSTEM

(75) Inventor: Christian Buck, Linköping (SE)

(73) Assignee: SAAB AB, Linköping (SE)

(*) Notice: Subject to any disclaimer, the term of this patent is extended or adjusted under 35 U.S.C. 154(b) by 0 days.

(21) Appl. No.: 09/485,485

(22) PCT Filed: Jul. 30, 1998

(86) PCT No.: PCT/SE98/01422

§ 371 Date: Feb. 11, 2000

§ 102(e) Date: Feb. 11, 2000

(87) PCT Pub. No.: WO99/09461

PCT Pub. Date: Feb. 25, 1999

(30) Foreign Application Priority Data

Aug. 13, 1997 (SE) .................................................. 9702918

(51) Int. Cl.$^7$ .................................................. G05B 11/42
(52) U.S. Cl. .................. 318/610; 318/609; 318/432; 318/433; 318/434
(58) Field of Search ...................... 318/609, 610, 318/432–434

(56) References Cited

U.S. PATENT DOCUMENTS

| | | | |
|---|---|---|---|
| 3,696,282 | * 10/1972 | Hirokawa et al. | 318/588 |
| 3,741,474 | * 6/1973 | Kawada et al. | 235/150.1 |
| 4,422,025 | * 12/1983 | Steller | 318/609 |
| 5,063,335 | * 11/1991 | Baechtel et al. | 318/609 |
| 5,119,005 | * 6/1992 | Tsai et al. | 318/618 |
| 5,528,119 | * 6/1996 | Rundqwist et al. | 318/632 |
| 5,646,492 | * 7/1997 | Nagano et al. | 318/432 |
| 5,721,477 | * 2/1998 | Sepehri et al. | 318/638 |
| 5,723,965 | * 3/1998 | Yim | 318/601 |
| 5,745,362 | * 4/1998 | Hiroi et al. | 364/162 |
| 5,935,177 | * 8/1999 | Cox et al. | 701/9 |
| 5,973,467 | * 10/1999 | Eguchi | 318/609 |
| 5,994,868 | * 11/1999 | Takeuchi et al. | 318/616 |

FOREIGN PATENT DOCUMENTS

| | | | |
|---|---|---|---|
| 360224157 | * 11/1985 | (JP) | 369/43 |
| 3212183 | 9/1991 | (JP) | G05B/11/36 |
| 407021571 | * 1/1995 | (JP) . | |
| 9128006 | 5/1997 | (JP) | G05B/11/36 |

OTHER PUBLICATIONS

J.J. Buchholz, "Time Delay Induced by Control Rate Saturation", Z. Flugwiss. Weltraumforsch, 17 (1993), 287–93.

* cited by examiner

Primary Examiner—Robert E. Nappi
Assistant Examiner—Tyrone Smith
(74) Attorney, Agent, or Firm—Swidler Berlin Shereff Friedman LLP

(57) ABSTRACT

The present invention relates to a method and a device for executing phase compensation in a control system of a motor-driven vehicle, in which the time derivative for an output signal (y) from a circuit (1) contained in the control system is limited relative to the time derivative for an input signal (u) to the circuit (1) if the time derivative for the input signal (u) exceeds a predetermined value. An error signal (ε) is formed between the output signal (y) and the signal (x) present in the circuit (1), the time derivative of which is not limited in relation to the time derivative for the input signal (u). The error signal (ε) is filtered via an asymptotically stable filter (3) to form a signal (δ), which is fed back and subtracted from the input signal (u) of the circuit (1) to form the signal (x). A conventional rate limiter may be used to form the output signal (y) from the signal (x).

8 Claims, 1 Drawing Sheet

METHOD AND APPARATUS FOR PHASE COMPENSATION IN A VEHICLE CONTROL SYSTEM

TECHNICAL FIELD

This invention relates to a method for executing phase compensation in a control system of a motor-driven vehicle, in which a time derivative for an output signal from a circuit contained in the control system is limited relative to a time derivative for an input signal to the circuit, if the time derivative for the input signal exceeds a predetermined value. The invention also relates to apparatus for executing phase compensation in the control system of a motor-driven vehicle, which includes a circuit comprising limiting means for limiting the time derivative of an output signal in relation to the time derivative for an input signal to the circuit, if the time derivative for the input signal exceeds a predetermined value, set by the limiting means.

BACKGROUND OF THE INVENTION

All (vehicle) control systems have physical actuators, e.g., electrical motors, hydraulic servo valves, etc. These actuators all have rate limits due to limits in power supply, hydraulic pressure, etc. Thus, all control systems inherently include restrictions with regard to the rate at which a new command from the driver of the vehicle, i.e., a change in the input signal into the control system, can give rise to corresponding changes in the physical output signal from the control system. If the time derivative for the input signal exceeds a certain value, the time derivative for the output signal is limited in relation to the time derivative for the input signal. This limitation is known as the rate limitation of the control system. When very rapid changed in the input signal are executed, for example when the input signal to the control system consists of an excessively rapid (or large) sinusoidal signal, a phase shift occurs between the input signal and the output signal. That is, the output signal is subject to a time delay in relation to the input signal. This phase shift leads to impairment of the performance of the vehicle and, in the worst case, can give rise to instability.

In aircraft applications, a so-called PIO (Pilot In-the-loop Oscillation) can occur when an excessively rapid change in the input signal causes the rate limitation of the control system to be exceeded. This can occur if an unforeseen circumstance causes the pilot to execute rapid and large movements with the control stick of the aircraft. The phase shift which occurs because of the rate limitation of the control system amplifies the oscillations. In the worst case these oscillations become divergent, which can result in loss of control over the movements of the aircraft.

The aforementioned rate limitation is more noticeable in aircraft which constitute a so-called unstable system. In this type of aircraft, the control surfaces of the aircraft are affected not only by the signals from the pilot, but also by stabilization signals generated in the control system, which are dependent on values obtained from sensors at different points in the aircraft.

One way of reducing the aforementioned problems in control systems with rate limitation involves the introduction of phase compensation when the rate limitation is active. Such phase compensation must meet the following requirements:

A. reduce the phase retardation in the case of sinusoidal input signals;
B. minimize the dynamic retardation for rapid ramp and steps;
C. provide the same input and output signal when the input signals are sufficiently slow.
D.

Different methods of executing phase compensation in control systems with rate limitation are previously disclosed in Buchholz, J. J. (1993): "Time delay induced by Control Surface Rate Saturation", Zeitschrift f. Flugwissenschaften und Weltraumforschung, Springer Verlag, Vol. 17, pp. 287–293; A'harrah, R. C. (1992); "Communique with DLR and others", NASA HQ, Washington DC, Jul. 14, 1992; and Chalk, C. R. (1992); "Study of a Software Rate Limit Concept", Calspan Flight Research Memorandum 635, Buffalo, N.Y. These methods use logical conditions (if-then-else) to establish whether a phase compensation requires to be executed in the control system. However, these conditions call for a jump to be made between at least two different dynamic behaviors for the respective methods. Thus, input signals can always occur which give rise to an undesired output signal. For this reason, none of these methods is suitable to be implemented in a control system with rate limitation.

A method for executing phase compensation in a control system of the described type solving the above mentioned problems is disclosed in U.S. Pat. No. 5,528,119.

It is an object of the present invention to provide a method and apparatus for executing phase compensation in a control system with rate limitation being an alternative to the above mentioned prior art methods.

BRIEF DESCRIPTION OF THE INVENTION

One object of the invention is to provide a method for executing phase compensation in a filter for such systems as defined in the claims by use of a phase compensation filter which has a nonlinear feedback of the output signal to the input. More specifically, when there is an error between an input signal and an output signal to the phase compensation filter, an error signal is formed. If the absolute value of said error signal exceeds a predetermined value, a level k of the nonlinear amplification is chosen. The input signal is low pass filtered and differentiated, whereupon it is multiplied with the nonlinear amplification level k for forming a product signal δ which is added to the input signal and led to a conventional rate limiting device thus forming the final output signal of the phase compensation filter.

The output signal produced in the filter after subtracting the product signal δ is in phase with the input signal sent to the filter device.

The level of phase compensation may be determined as a function of the derivative of the input signal and the error between input signal and output signal by the choice of a wanted filtering and the level of nonlinear amplification k.

When the level k of the nonlinear amplification is zero or when the differentiated input signal is zero the phase compensation filter acts as a conventional rate limiting device One advantage with a filter as disclosed according to the above presented aspect of the invention is that the phase compensating filter is stable against influence from noise and resonance disturbances on the dominating input signal.

Another advantage with the filter according to the above described aspect of the invention is that the filter upon input step formed signals acts as a conventional rate limiting device during a time interval when the time delay between the input signal and the output signal should be as short as possible. This is a difference between this invention and the method disclosed in U.S. Pat. No. 5,528,119, where the output signal has an exponential decay towards the input signal. Depending on the specific situation either of the two methods may be advantageous.

Yet another advantage with a filter according to the invention is that the filter is active when it is needed only, which may happen during rare occasions or perhaps never.

FIG. 1 shows an example of the effect of a phase compensating filter according to the invention as a curve y, the output signal, (continuous line) as a response from the filter to an input signal illustrated by curve u (dashed line) in the figure. A corresponding signal as a response from the same input signal when using a conventional rate limiting device is shown as a dotted curve c.

It may be noted that the response to the step function as indicated by the curve for the input signal u more rapidly is followed by the output signal y from the filter according to the invention compared to the output signal from a conventional rate limiting device.

The invention is primarily adapted for use in aircraft control but may as well be used in any type of vehicle control system.

According to a further aspect of the invention a device for carrying out the method is disclosed. Said device is described in the claims and further in the description of the embodiments.

EMBODIMENTS

The invention is intended primarily for use in control of aircraft which constitute a so-called unstable system. It should be appreciated, however, that the concepts of the invention also extend to control system in other types of motor driven vehicles, and may be applied thereto.

Figure 2:
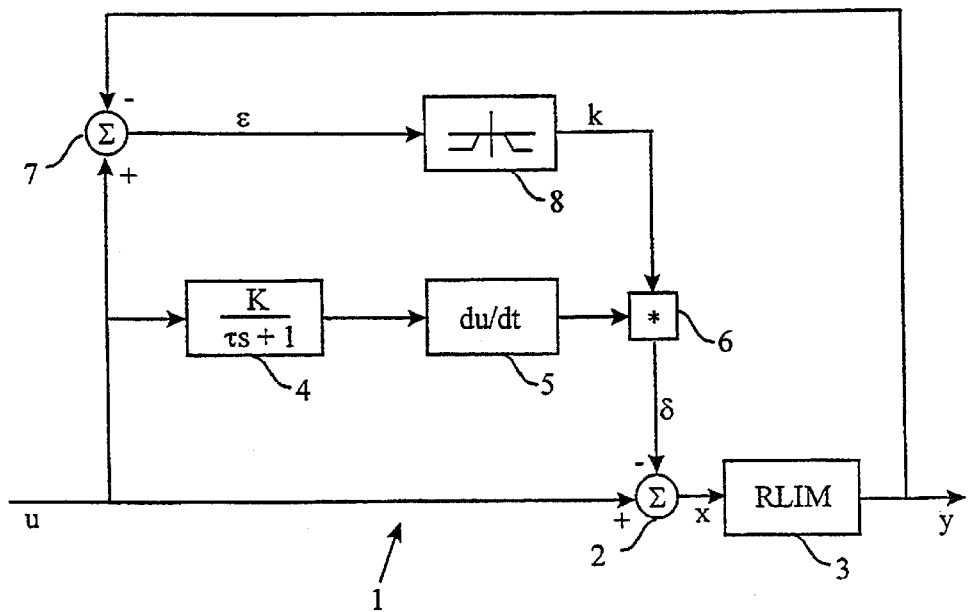
FIG. 2 shows schematically one example of a phase compensation filter according to the invention.

Referring now to the drawings, there is shown in FIG. 2 an embodiment of a filter device according to the invention. The input signal to the filter device is referred to by the reference u and the output signal from the device by the reference letter y.

The input signal u enters a main branch of the device and passes a first summing function 2, to which first summing function a product signal δ is subtracted. After the subtraction of product signal δ to the input u a resulting signal x is formed. The resulting signal x is then forwarded to a conventional rate limiting device 3, whereby the output signal y is generated at the output of said rate limiting device.

The input signal u is further conducted in a first parallel branch to a low pass filter 4 of a conventional type, e.g., a filter having the transfer function:

$$G(s)=K/(\tau s+1),$$

where K represents an amplification factor of the filter 4 and τ is its time constant. Under normal conditions, an input signal changes more slowly than the limitation applicable to the time derivative of the input signal. Thus, in a normal case, neither the rate limiting device 3 nor the feedback filter 4 will be activated in the device according to the invention.

In the first parallel branch the signal after having passed the low pass filter enters a differentiating block 5 where the signal is differentiated whereupon it enters a multiplier 6 in which multiplier 6 the low pass filtered and derivated signal is multiplied with a factor k. The signal formed after the multiplication of the factor k is the product signal δ referred to above.

The input signal u sent to the device as well as the output signal y from the filter device are both forwarded to a second summing function 7 in a second parallel branch of the device. A second error signal ε is generated in said second summing function 7. The second error signal ε is then in a nonlinear amplifier amplified for forming said factor k sent to the above mentioned multiplier 6.

Operation of the embodiment of FIG. 2 may be understood from the following description thereof.

The input signal u to the filter 1 device is sent to the second summing function 7 as is also the output signal from the filter device 1. The output signal y is subtracted from the input signal u in said second summing function 7, whereupon a second error signal ε is formed. The error signal ε is supplied to a nonlinear amplifier 8, where the amplitude of the second error signal ε controls the value of the amplification thus determining the factor k. As an example of a preferred embodiment the value k is set to −1 if the absolute value of the second error signal ε is greater than 0.1 (|ε|>0.1). Otherwise the value of factor k is set to zero.

The input signal u is also sent to a low pass filter, where the signal is low pass filtered and then differentiated in the differentiating block 5 and finally supplied to the multiplier 6, where the signal is multiplied with the above mentioned factor k for forming the product signal δ. If the factor k is not equal to zero, the product signal δ will have a sign opposite to the sign of the differentiated input signal.

The product signal δ is subtracted from the input signal u in the first summing function 2 for forming the sum of these two signals as the resulting signal x. The resulting signal x is a signal being in phase with the input signal u.

Finally the conventional rate limiting device 3 is rate limiting the resulting signal x for forming the output signal y from the filter device 1.

Figure 1:
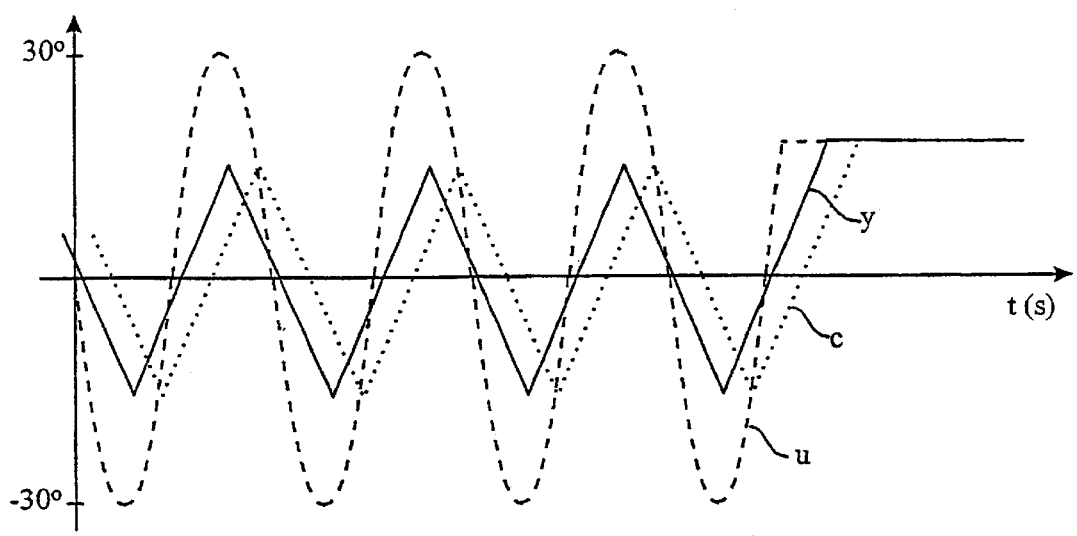
FIG. 1 shows the input signal (u) and the output signal (y) from a filter according to the invention and for comparison a curve (dotted) showing the output signal from a conventional rate limiting device.

The resulting output signal y after phase compensation is shown as a solid curve y in FIG. 1. The dashed curve u represents the input signal u at a speed too high for the rate limiting device. The figure also contains a dotted curve, which represents an output signal from a conventional rate limiting device, i.e. the signal obtained without the phase compensation utilized for correction of the input signal implemented in accordance with the invention.

As will be appreciated from a comparison of the curves of FIG. 1, the amplitude of the output signal y is reduced by the phase compensation. However, the phase displacement between input and output is clearly reduced, resulting in an output signal which is substantially in phase with the input signal. As a result, a driver or pilot will experience a more immediate response to a command.

As above noted, for the sake of simplicity the filter 1 has been illustrated as including a low-pass filter of the first order. In order for good results to be achieved, it is important to set the parameters of the filter at appropriate values, which parameters have to be determined for each application.

It is obvious and should be appreciated that the concept of the invention cannot be regarded as being restricted to the embodiment shown in the drawing, or to the example described above, but may be varied in many ways within the scope of the idea of invention. Thus, while a low-pass filter of the first order is specified in the preferred embodiment, this is done for the sake of simplicity, and it should be quite clear that the other types of asymptotically stable filters may also be used.

What is claimed is:

1. A control system of a vehicle for providing an output signal (y) having a time derivative which is limited in relation to a time derivative of an input signal (u) if the time derivative for the input signal (u) exceeds a predetermined value and for phase compensating the output signal (y) in relation to the input signal (u), characterized in that the control system comprises second error signal forming means (7) for forming an error signal ϵ between the output signal (y) and the input signal (u), amplification means (8) generating a factor k in dependence of the amplitude of the second error signal ϵ, differentiating means (5, 6) for differentiating the input signal (u), a multiplier (6) for forming a product signal (δ) being the product of the differentiated input signal (u) and the factor k, first summing means (2) for subtracting the product signal (δ) from the input signal (u) and for forming a signal (x) sent to a rate limiting device (3) producing the output signal (y) being in phase with the input signal (u).

2. A control system according to claim 1, characterized in that the amplification means (8) is a nonlinear amplifier giving an output amplitude of the factor k in dependence of the level of the amplitude of the second error signal ϵ.

3. A control system according to claim 1, characterized in that a low pass filter (4) is connected between the input signal (u) and the differentiating means (5).

4. A control system according to claim 3, characterized in that said filter means is an asymptotically stable low pass filter.

5. A method in a control system of a vehicle for providing an output signal (y) having a time derivative which is limited in relation to a time derivative of an input signal (u) if the time derivative for the input signal (u) exceeds a predetermined value and for phase compensating the output signal (y) in relation to the input signal (u), the method comprising the steps of forming a second error ϵ from the output signal (y) and the input signal (u), generating a factor k in dependence of the amplitude of said second error signal ϵ, differentiating the input signal (u), forming a product signal (δ) being the product of the differentiated input signal (u) and the factor k, subtracting said product signal (δ) from the input signal (u) for forming a signal (x) sent to a rate limiting device (3) producing the output signal (y).

6. A method according to claim 5 comprising the step of forming the factor k in a nonlinear amplifier (8).

7. A method according to claim 6 comprising the step of setting the factor k to a negative value if the absolute value of the second error signal ϵ is greater than zero, otherwise the value of k is set to zero.

8. A method according to claim 5 comprising the step of low pass filtering the input signal (u) in a low pass filter before differentiating the input signal (u).

* * * * *